United States Patent
Chao

(10) Patent No.: US 7,644,501 B2
(45) Date of Patent: Jan. 12, 2010

(54) COLLAPSIBLE HANDSAW FRAME

(76) Inventor: Walley Chao, 3F, No. 157, Sec. 1, Mei Tsun Rd., Taichung (TW)

( * ) Notice: Subject to any disclaimer, the term of this patent is extended or adjusted under 35 U.S.C. 154(b) by 118 days.

(21) Appl. No.: 11/727,782

(22) Filed: Mar. 28, 2007

(65) Prior Publication Data

US 2008/0115370 A1     May 22, 2008

(30) Foreign Application Priority Data

Nov. 17, 2006    (TW) ............................... 95220361 U

(51) Int. Cl.
*B27B 21/00*    (2006.01)
(52) U.S. Cl. .............................. 30/512; 30/513; 30/506; 30/507; 30/342
(58) Field of Classification Search ................... 30/512, 30/513, 329, 122, 506, 507, 508, 509, 511, 30/342
See application file for complete search history.

(56) References Cited

U.S. PATENT DOCUMENTS

| | | | | | |
|---|---|---|---|---|---|
| 1,429,195 | A | * | 9/1922 | Donaldson | ................... 30/512 |
| 3,250,307 | A | * | 5/1966 | Schmidt et al. | ................ 30/512 |
| 5,208,986 | A | * | 5/1993 | Ryon et al. | .................... 30/506 |
| 5,440,816 | A | * | 8/1995 | Dustrude | ...................... 30/512 |
| 5,706,585 | A | * | 1/1998 | Wang | ........................... 30/512 |
| 6,158,131 | A | * | 12/2000 | Costanzo et al. | .............. 30/506 |
| 6,230,412 | B1 | * | 5/2001 | Lin | .............................. 30/512 |

FOREIGN PATENT DOCUMENTS

TW            317215         10/1997

\* cited by examiner

*Primary Examiner*—Boyer D Ashley
*Assistant Examiner*—Omar Flores-Sánchez

(57) ABSTRACT

A handsaw for holding a saw blade for cutting is disclosed to include a handle having an cantilever bar, an extension bar pivoted to the cantilever bar and turnable relative to the handle between a received position and an extended position, a blade-retaining arm pivoted to one end of the extension bar remote from the handle and turnable about the axis of the extension bar, and two blade retaining members respectively provided at the handle and the blade-retaining arm for the mounting of a saw blade when the extension bar is turned to the extended position.

4 Claims, 7 Drawing Sheets

COLLAPSIBLE HANDSAW FRAME

BACKGROUND OF THE INVENTION

1. Field of the Invention

The present invention relates generally to hand tools and more particularly, to a collapsible handsaw frame for holding a saw blade of handsaw.

2. Description of the Related Art

A handsaw is a convenient manual cutting tool for cutting things, for example, for trimming branches of trees during gardening or cutting away obstacles during hunting. However, the frame of a regular handsaw is neither deconstructable nor bendable. When a regular handsaw is not in use, is requires much space for storage.

To eliminate the aforesaid problem, Taiwan Patent Publication No. 317215 discloses a handsaw entitled "Improved structure of saw", which comprises a base frame bar, a grip pivoted to one end of the frame bar, and a saw blade receivable to the base frame bar. This design of handsaw is collapsible. However, the base frame bar has a length approximately equal to the length of the saw blade, such that the collapsed saw is still not convenient for carrying or storage. Further, when collapsing or extending out the saw, the grip is biased relative to the base frame bar through a big angle. Therefore, this design of saw is not suitable for use in a narrow place.

SUMMARY OF THE INVENTION

The present invention has been accomplished under the circumstances in view. It is one objective of the present invention to provide a handsaw frame for handsaw, which is collapsible to simplify storage management.

To achieve this objective of the present invention, the collapsible handsaw frame comprises a handle having a coupling portion; an extension bar having a first end with a coupling portion pivotally coupled to the coupling portion of the handle for allowing turning of the extension bar relative to the handle between a received position and an extended position; and a blade-retaining arm pivoted to a second end of the extension bar and turnable about the axis of the second end of the extension bar. When the extension bar is in the extended position, two opposite ends of a saw blade can be respectively mounted to the handle and the blade-retaining arm. After removal of the saw blade from the handle and the blade-retaining arm, the blade-retaining arm is turned about the extension bar through 180°, and then the extension bar is turned to the received position, and thus the blade-retaining arm and the extension bar are received to the handle, reducing the size of the handsaw frame for storage.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
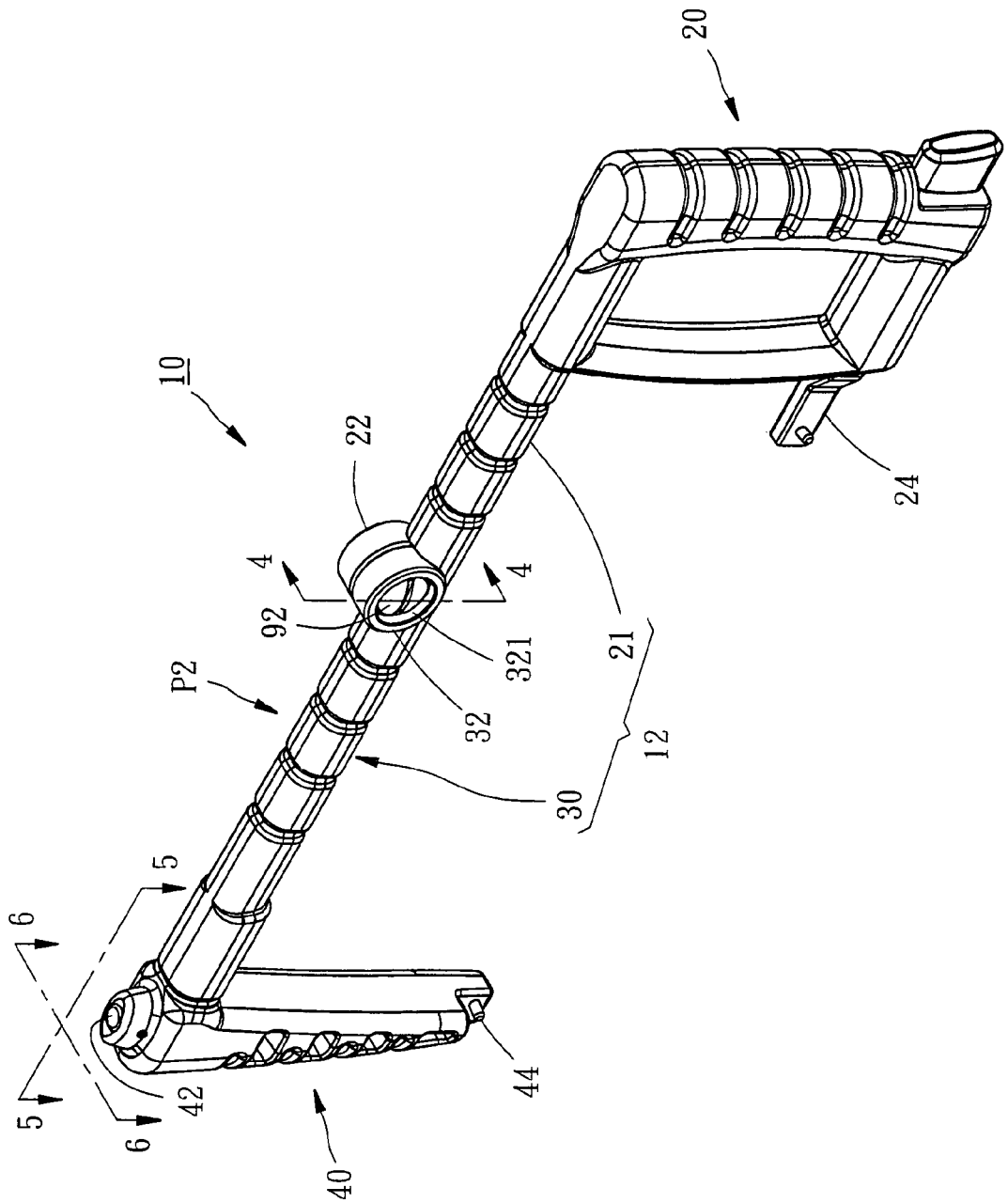
FIG. 1 is a perspective view of a collapsible handsaw frame according to a preferred embodiment of the present invention.
Figure 2:
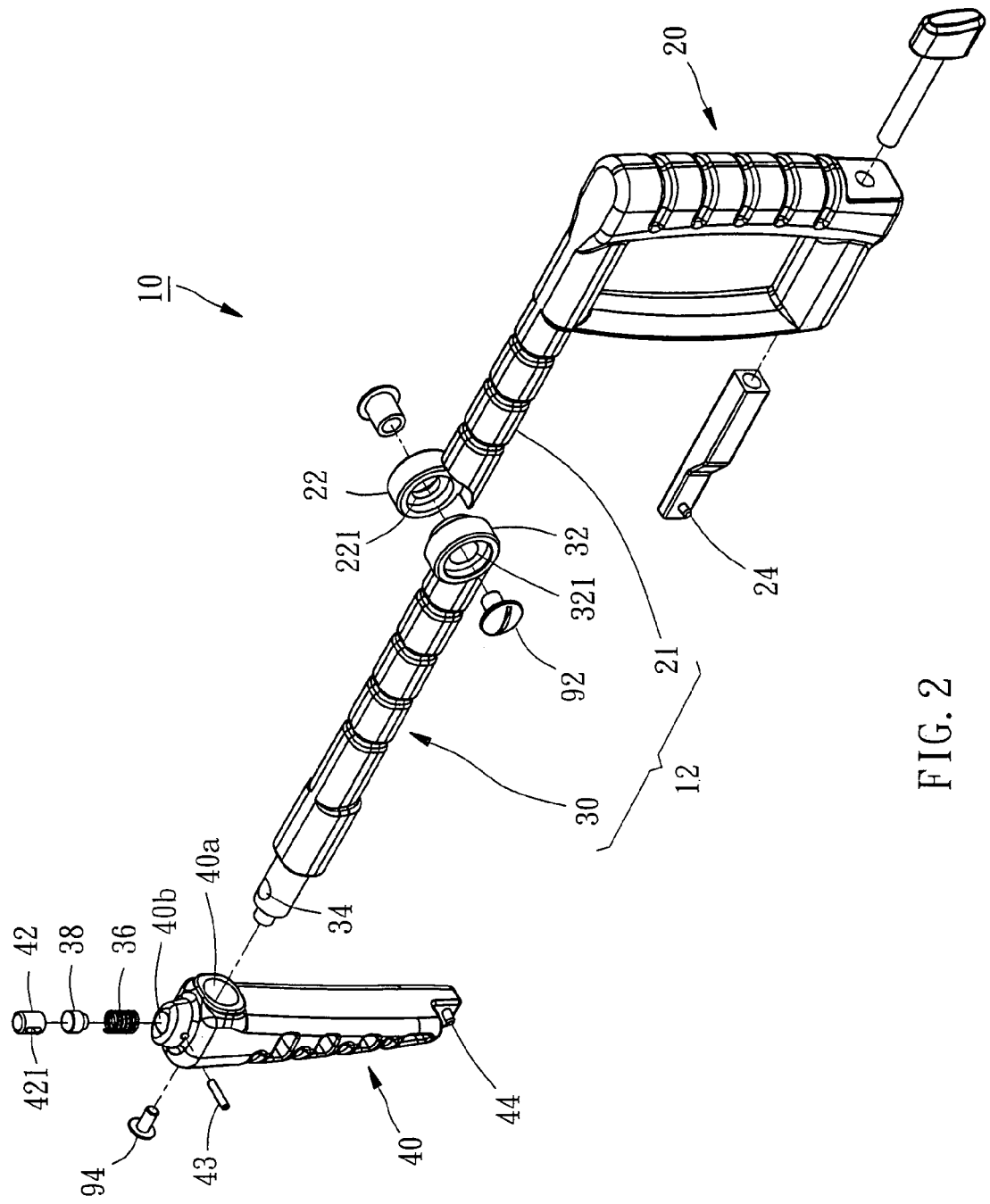
FIG. 2 is an exploded view of the collapsible handsaw frame according to the preferred embodiment of the present invention.

As shown in FIGS. 1-10, a collapsible handsaw frame 10 for holding therein a saw blade 90 for cutting in accordance with a preferred embodiment of the present invention comprises a handle 20, an extension bar 30 and a blade-retaining arm 40.

The handle 20 has a cantilever bar 21 provided at the free end thereof with a coupling portion 22 having a through hole 221. A blade retaining member 24 is inserted through the bottom portion of the handle 20 for holding one end of the saw blade 90.

Figure 10:
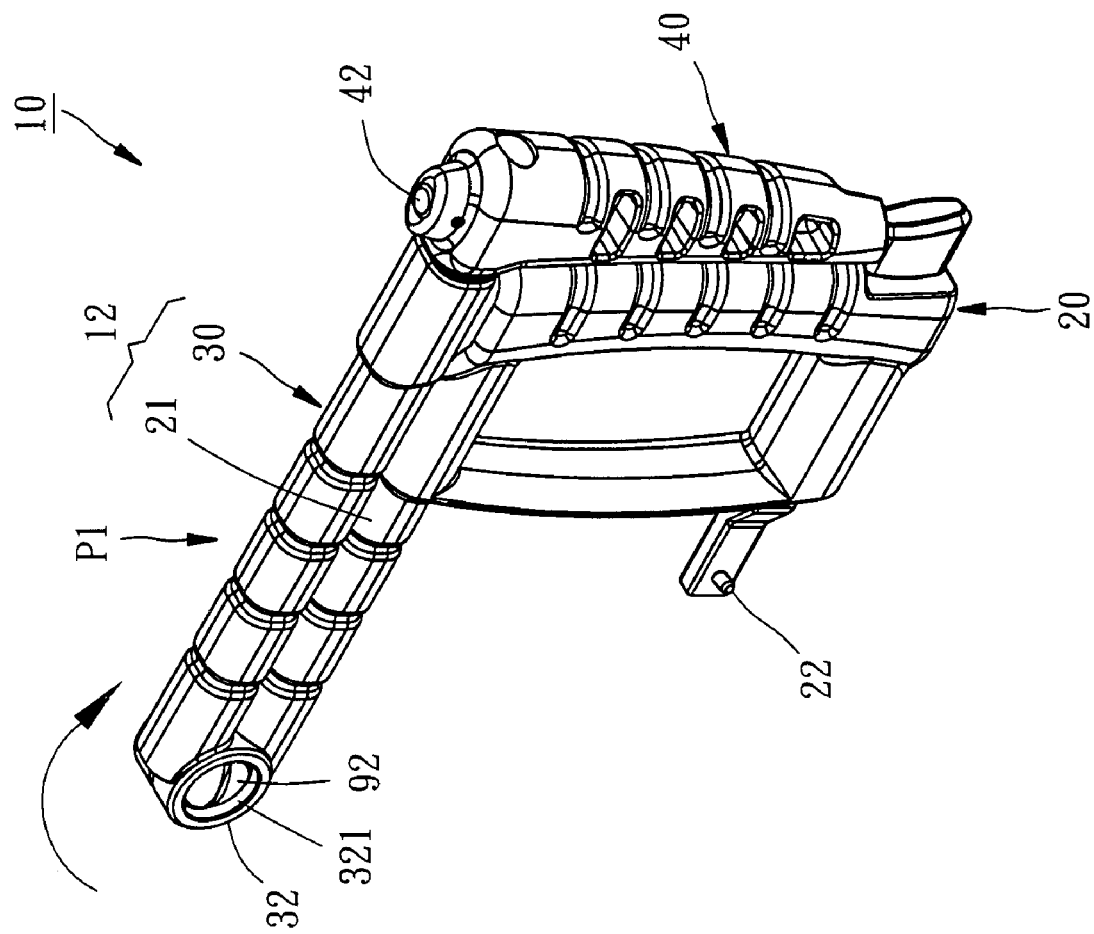
FIG. 10 illustrates the collapsed status of the handsaw frame according to the present invention.

The extension bar 30 has a coupling portion 32 provided at a first end thereof and pivotally attached to the coupling portion 22 of the handle 20. The coupling portion 32 of the extension bar 30 has a through hole 321 axially aligned with the through hole 221 of the cantilever bar 21 of the handle 20. A pivot member, for example, a rivet 92 is inserted through the through holes 321 and 221 such that the extension bar 30 is pivotally connected to the cantilever bar 21 of the handle 20 and the cantilever bar 21 and the extension bar 30 constitute a collapsible handsaw frame body 12. The extension bar 30 is biasable relative to the cantilever bar 21 between a received position P1 where the extension bar 30 is parallel attached to the cantilever bar 21 as shown in FIG. 10, and an extended position P2 where the extension bar 30 is axially aligned with the cantilever bar 21 in a line as shown in FIG. 1. According to this embodiment, the maximum biasing angle of the extension bar 30 is about 180°. The extension bar 30 has a recessed hole 34 near a second end thereof. The recessed hole 34 accommodates a spring member 36 and a retaining member 38. The spring member 36 has one end stopped against the extension bar 30 and the other end stopped against the retaining member 38, which is movable along the direction of the axis of the spring member 36.

Figure 3:
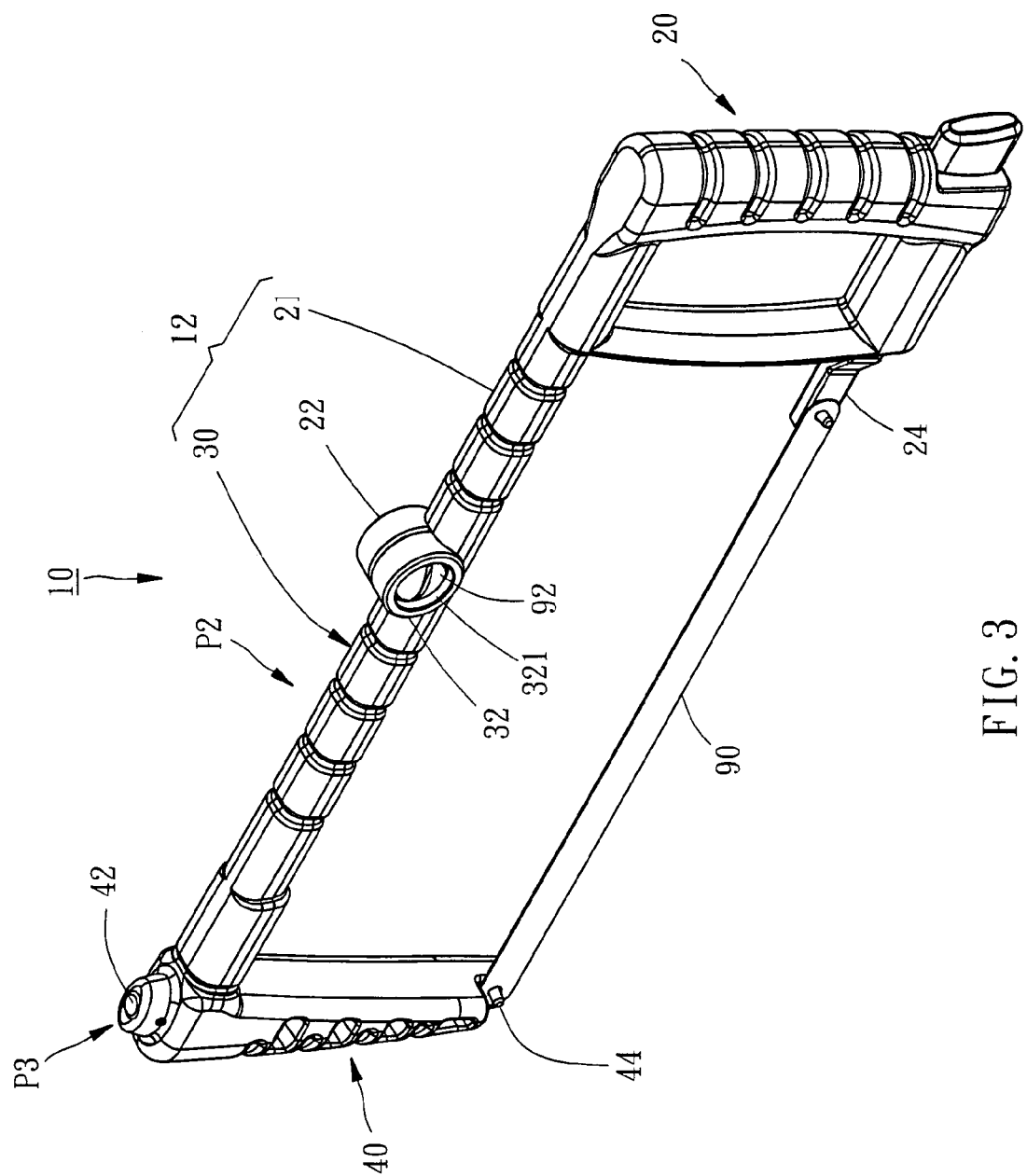
FIG. 3 is a perspective view of the collapsible handsaw frame of the present invention in which a saw blade is installed.
Figure 6:
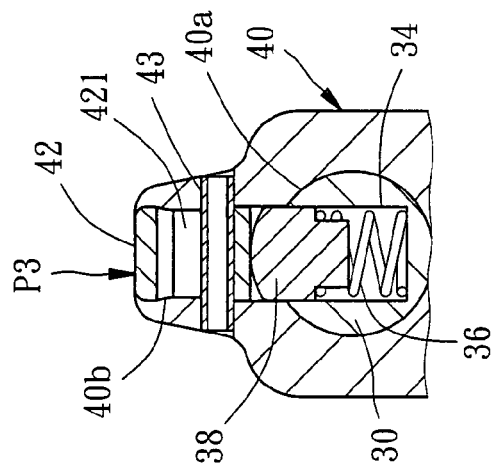
FIG. 6 is a sectional view taken along line 6-6 of FIG. 1.
Figure 5:
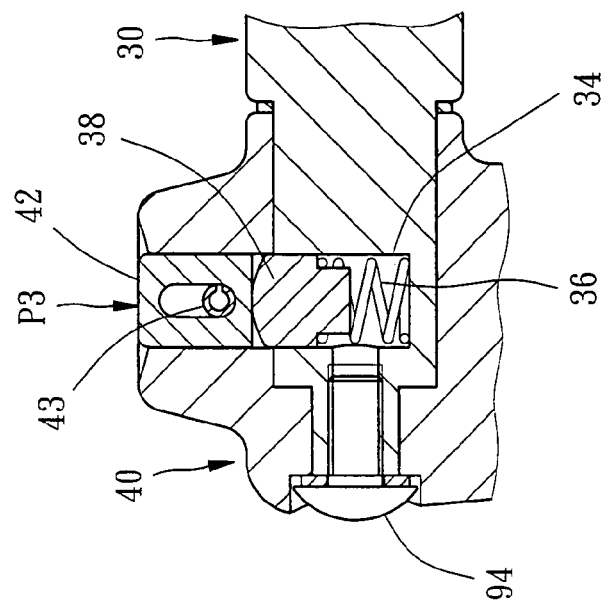
FIG. 5 is a sectional view taken along line 5-5 of FIG. 1.
Figure 4:
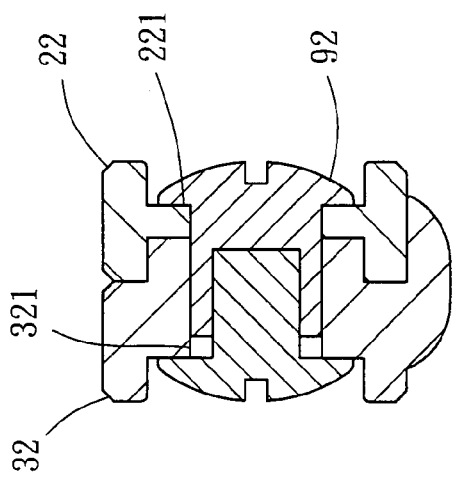
FIG. 4 is a sectional view taken along line 4-4 of FIG. 1.

The blade-retaining arm 40 has a transverse through hole 40a and a receiving hole 40b in communication with the transverse through hole 40a. The blade-retaining arm 40 is pivotally connected with its one end to the second end of the extension bar 30 by a screw bolt 94, and turnable about the screw bolt 94 relative to the extension bar 30, i.e., the blade-retaining arm 40 is turnable about the axis of the extension bar 30. As shown in FIG. 6, the second end of the extension bar 30 is pivotally inserted into the transverse through hole 40a of the blade-retaining arm 40 in such a manner that the recessed hole 34 of the extension bar 30 is axially aligned with the receiving hole 40b of the blade-retaining arm 40. A sliding block 42 is inserted into the receiving hole 40b of the blade-retaining arm 40 and secured to the blade-retaining arm 40 by a pivot pin 43. The sliding block 42 has an elongated slot 421 through which the pivot pin 43 is inserted such that the sliding block 42 is slidable in the receiving hole 40b of the blade-retaining arm 40. The sliding block 42 is kept in contact with one end of the retaining member 38 opposite to the spring member 36. The spring member 36 supports the retaining member 38 in a first position P3, as shown in FIGS. 3 and 6, where the retaining member 38 partially protrudes into the receiving hole 40b of the blade-retaining arm 40 such that the blade-retaining arm 40 is prohibited from turning relative to the extension bar 30. The sliding block 42 can be pressed by an external force to move the retaining member 38 from the first position P3 to a second position P4 where the retaining member is totally received in the recessed hole 34 of the extension bar 30, such that the blade-retaining arm 40 is unlocked and turnable about the axis of the extension bar 30. The blade-retaining arm 40 has a blade retaining member 44 at the bottom portion for holding the other end of the saw blade 90.

Figure 7:
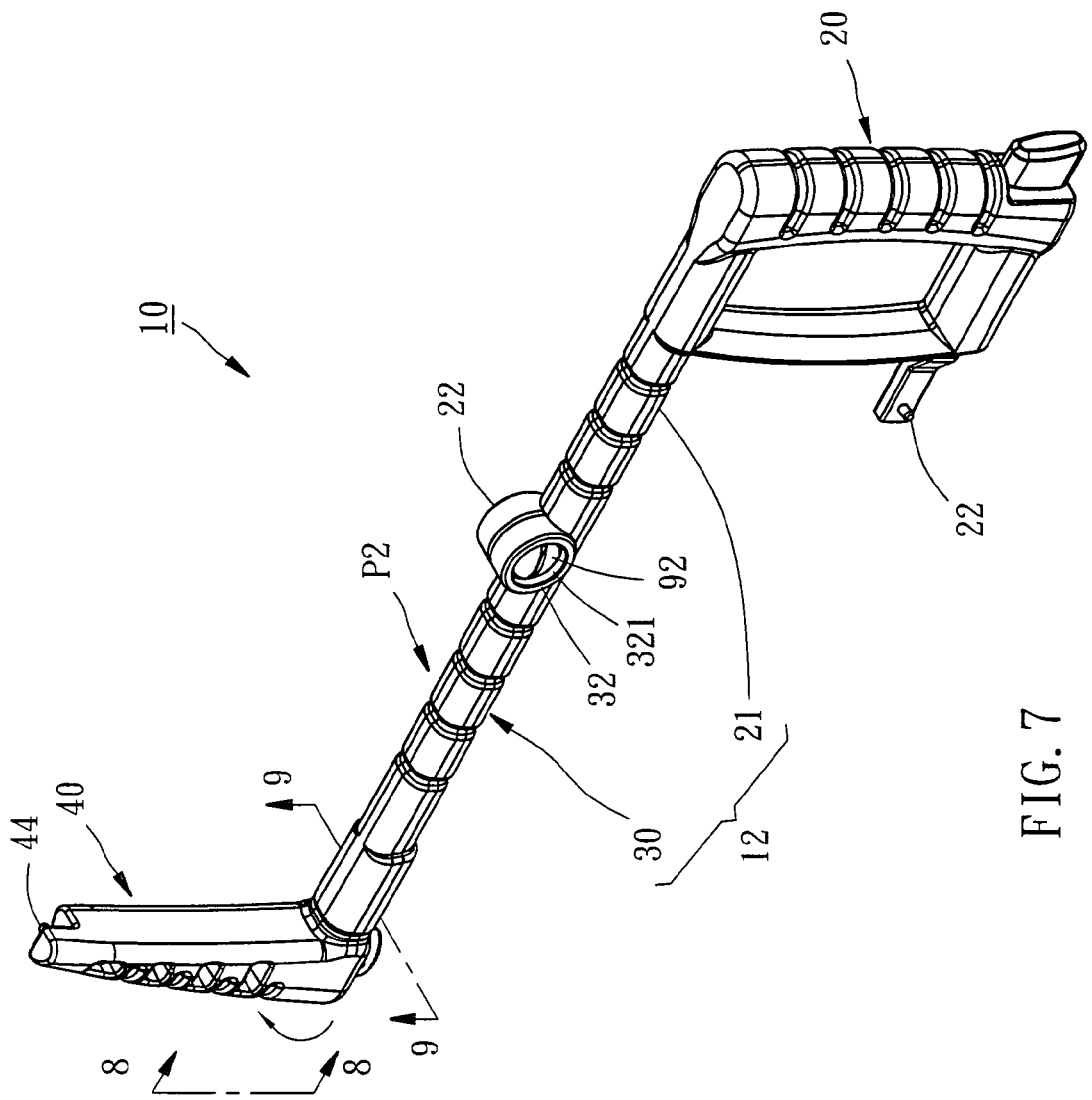
FIG. 7 is a schematic drawing of the present invention, showing that the blade-retaining arm is turned relative to the extension bar to an upright posture.
Figure 9:
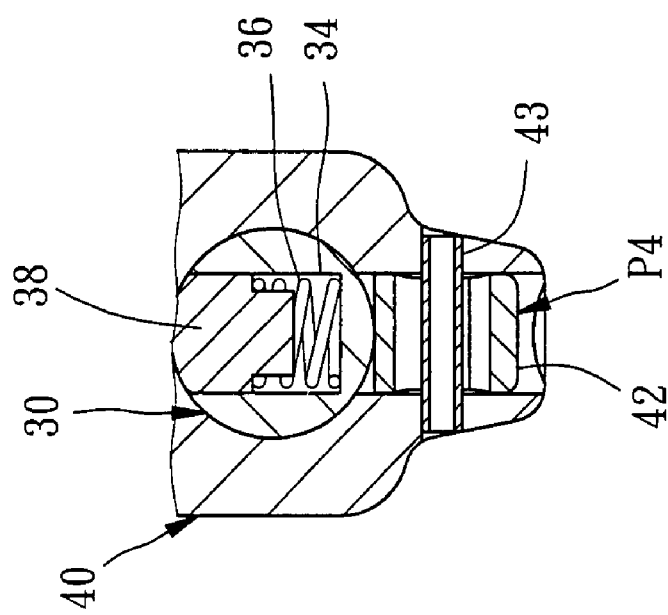
FIG. 9 is a sectional view taken along line 9-9 of FIG. 7.
Figure 8:
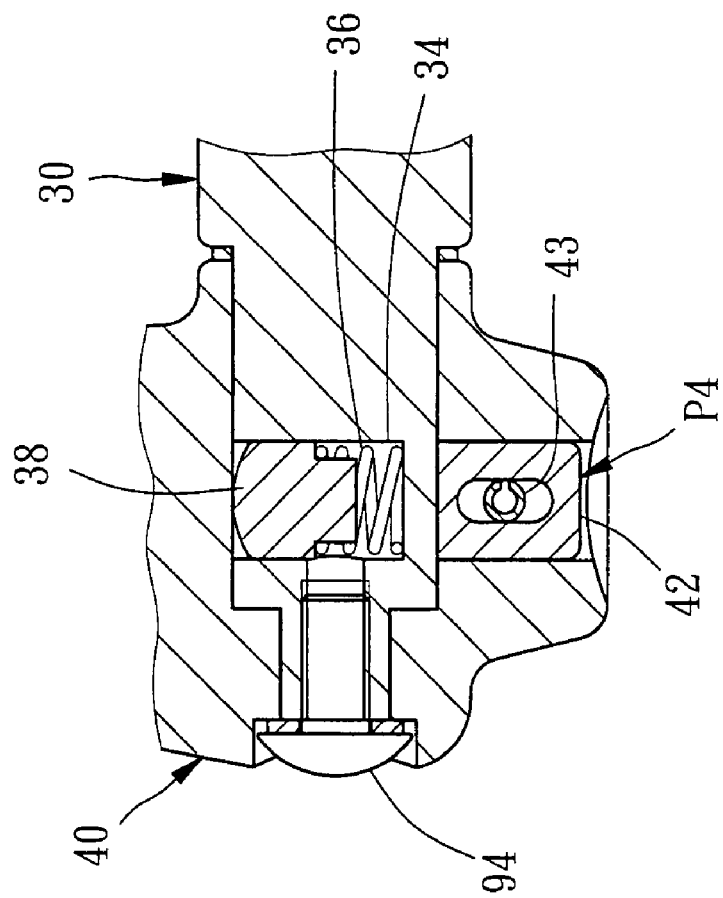
FIG. 8 is a sectional view taken along line 8-8 of FIG. 7.

When the user wants to collapse the handsaw frame 10, the user can operate the steps as follows.

a) Press the sliding block 42 to move the retaining member 38 from the first position P3 to the second position P4 for allowing turning of the blade-retaining arm 40 about the axis of the extension bar 30, and then turn the blade-retaining arm 40 about the axis of the extension bar 30 through 180° to change the posture of the blade-retaining arm 40 relative to the extension bar 30, and then release the sliding block 42, and therefore the blade-retaining arm 40 is locked to the extension bar 30 at an upright posture (see FIGS. 7-9).

b) Turn the extension bar 30 relative to the cantilever bar 21 from the extended position P2 to the received position P1. At this time, the extension bar 30 is closely attached to one side of the handle 20, i.e. the handsaw frame body 12 is folded up, such that the handsaw frame 10 is collapsed (see FIG. 10).

When reversing the aforesaid procedure, the handsaw frame 10 is extended out for the mounting of the saw blade 90.

As indicated above, the handsaw frame of the present invention can be folded up and received in a collapsed manner. When collapsed, the length of the collapsed handsaw frame is about one half of the length of the saw blade. Therefore, the collapsed handsaw frame is convenient for carrying and storage. Further, the operation of the present invention is quite simple. Through a small biasing action, the handsaw frame is extended out. Therefore, the invention is free from space constraint and simplifies storage management.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A handsaw frame for holding a saw blade, comprising:
a handle for mounting an end of a saw blade, the handle having a coupling portion;
an extension bar having a first end with a coupling portion pivotally coupled to the coupling portion of the handle for allowing turning of the extension bar relative to the handle between a received position and an extended position, and a second end; and
a blade-retaining arm pivoted to the second end of the extension bar and turnable about the axis of the second end of the extension bar for mounting of an opposite end of the saw blade mounted to the handle when the extension bar is in the extended position;
wherein the second end of the extension bar has a recessed hole in which a spring member and a retaining member are received;
the blade-retaining arm has a receiving hole in which a sliding block contacting the retaining member is inserted and slidable between
a first position where the retaining member partially protrudes into the receiving hole of the blade-retaining arm such that the blade-retaining arm is prohibited from turning relative to the extension bar, and
a second position where the retaining member is totally received in the recessed hole of the extension bar such that the blade-retaining arm is turnable relative to the extension bar.

2. The handsaw frame as claimed in claim 1, wherein the coupling portion of the handle has a through hole; the coupling portion of the extension bar is attached to the coupling portion of the handle and provided with a through hole axially aligned with the through hole of the handle; wherein a pivot member is inserted through the through holes of the coupling portions of the handle and the extension bar such that the coupling portion of the extension bar is pivotally connected to the coupling portion of the handle.

3. The handsaw frame as claimed in claim 1, wherein the handle has a cantilever bar defining the coupling portion of the handle and constituting with the extension bar a collapsible handsaw frame body.

4. The handsaw frame as claimed in claim 1, further comprising a first blade retaining member and a second blade retaining member respectively provided at the handle and the blade-retaining arm for the mounting of two opposite ends of a saw blade respectively.

* * * * *